United States Patent
Freiberg et al.

(10) Patent No.: US 9,639,526 B2
(45) Date of Patent: May 2, 2017

(54) MOBILE LANGUAGE TRANSLATION OF WEB CONTENT

(71) Applicant: Microsoft Corporation, Redmond, WA (US)

(72) Inventors: Oren Freiberg, Seattle, WA (US); Chris Wendt, Woodinville, WA (US); Vikram Dendi, Redmond, WA (US); Charles Morris, Seattle, WA (US); Chee Chen Tong, Kirkland, WA (US); Yongik Chung, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 376 days.

(21) Appl. No.: 14/152,903

(22) Filed: Jan. 10, 2014

(65) Prior Publication Data

US 2015/0199338 A1    Jul. 16, 2015

(51) Int. Cl.
*G06F 17/28* (2006.01)
*G06F 17/30* (2006.01)
*G06F 17/27* (2006.01)

(52) U.S. Cl.
CPC .......... *G06F 17/289* (2013.01); *G06F 17/275* (2013.01); *G06F 17/30867* (2013.01); *G06F 17/30905* (2013.01)

(58) Field of Classification Search
CPC ...... G06F 17/289; G06F 17/28; G06F 17/275; G06F 17/30867; G06F 9/4448
See application file for complete search history.

(56) References Cited

U.S. PATENT DOCUMENTS

| | | | | |
|---|---|---|---|---|
| 6,119,078 A * | 9/2000 | Kobayakawa | ........ | G06F 17/272 704/3 |
| 6,311,180 B1 * | 10/2001 | Fogarty | ............. | G06F 17/30905 707/749 |
| 6,999,916 B2 * | 2/2006 | Lin | ........................ | G06F 17/289 704/2 |
| 7,139,696 B2 * | 11/2006 | Tokieda | ................ | G06F 17/289 704/4 |
| 7,433,895 B2 * | 10/2008 | Li | ..................... | G06F 17/30864 |
| 7,712,028 B2 * | 5/2010 | Kuruoglu | .............. | G06F 17/241 715/230 |
| 7,970,784 B2 * | 6/2011 | Bode | ................. | G06F 17/30669 704/2 |

(Continued)

OTHER PUBLICATIONS

"Microsoft Translator (and Bing Translator) Official Team Blog", 48 pages, Published on: Oct. 2, 2013, Available at: http://blogs.msdn.com/b/translation/rss.aspx?Redirected=true.

(Continued)

*Primary Examiner* — Laurie Ries
(74) *Attorney, Agent, or Firm* — Klarquist Sparkman, LLP

(57) ABSTRACT

Techniques are described for improving language translation of content (e.g., web content) on computing devices (e.g., mobile computing devices). For example, automatic translation can be performed when entering reading view in association with displayed web content by determining that the displayed web content is not in a language that is understood by the user (e.g., as indicated by language settings). As another example, language-related meta-data can be passed between applications and used in language detection of content, such as web content.

20 Claims, 10 Drawing Sheets

(56) References Cited

U.S. PATENT DOCUMENTS

| | | | | |
|---|---|---|---|---|
| 8,249,854 | B2* | 8/2012 | Nikitin | G06F 17/289 704/2 |
| 8,484,218 | B2* | 7/2013 | Raghunath | G06F 17/2818 707/739 |
| 9,213,685 | B2* | 12/2015 | Travieso | G06F 17/2288 |
| 2001/0025288 | A1* | 9/2001 | Yanase | G06F 17/24 715/234 |
| 2001/0056352 | A1* | 12/2001 | Xun | G06F 17/271 704/277 |
| 2002/0073121 | A1* | 6/2002 | Sano | G06F 17/24 715/255 |
| 2003/0212673 | A1* | 11/2003 | Kadayam | G06F 17/30864 |
| 2004/0141016 | A1* | 7/2004 | Fukatsu | G06F 17/30873 715/856 |
| 2004/0148571 | A1* | 7/2004 | Lue | G06F 17/30905 715/239 |
| 2006/0190240 | A1* | 8/2006 | Shin | G06F 17/279 704/1 |
| 2007/0219970 | A1* | 9/2007 | Dunie | G06F 17/30011 |
| 2008/0181505 | A1* | 7/2008 | Wu | G06K 9/6828 382/190 |
| 2008/0313528 | A1* | 12/2008 | Chang | G06Q 10/10 715/200 |
| 2009/0327866 | A1* | 12/2009 | Li | G06F 17/30 715/234 |
| 2010/0083104 | A1* | 4/2010 | Hirano | G06F 17/30622 715/259 |
| 2011/0301938 | A1* | 12/2011 | Agrawal | G06F 17/21 704/8 |
| 2011/0313755 | A1* | 12/2011 | Oh | G06F 17/289 704/3 |
| 2012/0016655 | A1* | 1/2012 | Travieso | G06F 17/2827 704/2 |
| 2012/0290911 | A1* | 11/2012 | Zhao | G06F 17/30905 715/205 |
| 2013/0103383 | A1* | 4/2013 | Du | G06F 3/0488 704/3 |
| 2013/0166276 | A1* | 6/2013 | Raichelgauz | G06F 17/28 704/2 |
| 2014/0052434 | A1* | 2/2014 | Bank | G06F 17/289 704/2 |
| 2014/0193047 | A1* | 7/2014 | Grosz | G06F 3/1242 382/118 |
| 2014/0222979 | A1* | 8/2014 | St. Clair | H04L 67/22 709/221 |
| 2014/0278342 | A1* | 9/2014 | Shoshan | G06F 17/289 704/2 |
| 2014/0372099 | A1* | 12/2014 | Ronin | G06F 17/289 704/2 |
| 2015/0121181 | A1* | 4/2015 | Joshi | G06F 17/2745 715/202 |

OTHER PUBLICATIONS

Russell, Jon, "Google Introduces Native Translations to Google+; Initially Coming to Desktop, Mobile Apps Soon", 5 pages, Published on: Aug. 20, 2013, Available at: http://thenextweb.com/google/2013/08/20/google-begins-rolling-out-native-translations-initially-on-desktop-version-coming-to-mobile-soon/.

Olivarez-Giles, Nathan, "Chrome for Android Automatically Translates the Web in Latest Beta", 4 pages, Published on: May 23, 2013, Available at: http://www.theverge.com/2013/5/23/4360728/chrome-android-google-translate-beta-28.

Samanta, et al., "Automatic Language Translation for Mobile SMS", In International Journal of Information Communication Technologies and Human Development, 7 pages, Dec. 2010.

Wikipedia, "Word Lens," <http://en.wikipedia.org/wiki/Word_Lens>, 7 pages (accessed Dec. 9, 2013).

* cited by examiner

SOFTWARE 680 IMPLEMENTING DESCRIBED TECHNOLOGIES

MOBILE LANGUAGE TRANSLATION OF WEB CONTENT

BACKGROUND

Users of computing devices, such as mobile phones and tablets, use their devices to access many types of online content, some of which may be in foreign languages which the users do not understand. For example, a user may receive a link to a web page from a friend living in another country where the web page is in a foreign language. As another example, a user may be traveling to a different country and access local web sites that are in a foreign language that the user cannot read.

Existing solutions can be used to translate content into a known language. For example, a user can use a translation service (e.g., a website that provides translation services) to translate text from one language to another. However, using such translation services may require the user to access a different application or visit a particular website in order to perform the translation.

In other solutions, an application can perform language detection and prompt the user to perform translation. However, such solutions can require a significant amount of computing resources (e.g., computing resources used to perform local language detection and/or computing resources needed to transmit and receive information from a remote language detection or translation service) regardless of whether the user decides to translate the content.

Therefore, there exists ample opportunity for improvement in technologies related to language translation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques are described for improving language translation of content (e.g., web content) on computing devices (e.g., mobile computing devices). In some of the technologies described herein, automatic translation is performed when entering reading view. For example, a selection of a reading view can be received (e.g., from a user) in association with displayed web content (e.g., as part of a web page). A determination can be made to translate at least a portion of the displayed web content upon receiving the selection of the reading view and upon determining that the language of the web content is not a language understood by the user viewing the web content. The web content can then be translated into a language understood by the user and displayed in the reading view. Automatic translation can be performed without having to prompt the user to perform translation (e.g., without having to ask the user whether to perform translation).

In some of the technologies described herein, language-related meta-data us used to improve language detection. For example, language-related meta-data can be received from a first application and used by a second application to improve language detection (e.g., for detecting the language, or languages, present in web content).

As described herein, a variety of other features and advantages can be incorporated into the technologies as desired.

DETAILED DESCRIPTION

Overview

Figure 1A:
FIGS. 1A, 1B, and 1C are diagrams depicting a computing device performing automatic translation of web content upon entering reading view.

As described herein, various techniques and solutions can be applied to improve language translation of content (e.g., web content) on computing devices (e.g., mobile computing devices). In some implementations, automatic translation is performed when entering reading view. For example, a user of a mobile computing device can view a web page in a mobile browser running on the mobile computing device. The user can select a reading view in order to view the web page using a simplified layout. Upon selection of the reading view, web content (e.g., text web content) within the web page can be automatically translated and displayed in the reading view in a language that the user can understand. For example, if the web page is in English, but the user only understands Chinese (the user does not read English), then the web page content can be automatically translated when the user selects the reading view and displayed in Chinese within the reading view.

Automatically translating web content when entering reading view can be performed automatically and without user intervention (e.g., without the user being prompted to perform the translation). For example, if a determination is made that the user does not understand the language of the web content then the web content can be automatically translated upon entering reading view and the translated content can be displayed to the user (e.g., instead of displaying the content in its original language in the reading view).

Performing automatic language translation when entering reading view can provide advantages. For example, existing language translation solutions may prompt the user to perform translation. Instead of prompting the user to perform the translation, the technologies described herein can perform automatic translation when entering reading view. As another example, existing language translation solutions may require language detection before prompting the user to determine whether to perform the translation or not, which can take time and consume significant computing resources which can be wasted if the user decides not to perform the translation. Instead of performing language detection before prompting the user, the technologies described herein, in some implementations, only perform language detection after reading view has been selected (e.g., and a desire to read the content in a language that the user knows can be inferred). In these implementations, time and computing resources can be saved because language detection can be performed only when entering reading view (i.e., if reading view is not entered, then no language detection is performed in these implementations).

In some implementations, accuracy and/or efficiency of language detection is improved using language-related meta-data. Language-related meta-data can be obtained from a variety of sources. For example, language-related meta-data can be obtained from device and/or application settings (e.g., phone language settings, keyboard language settings, browser language settings, time zone, etc.), communication details (e.g., language used for communications, such as instant messages, emails, etc.), various types of content (e.g., languages detected within photos, languages of visited web sites, etc.), and/or from other sources.

Language-related meta-data can be used to improve the accuracy and/or efficiency of language detection of web content. For example, if an English speaking user receives a communication from a friend in France (whose is a native French speaker) with a link to a web page with a ".fr" top-level domain, then language-related meta-data (e.g., that the link was from a person from France that speaks French and the link is to a French domain) can be passed to a web browser when the user opens the link to the web page. The web browser can then use the received language-related meta-data to improve language detection of the web page. For example, the web browser can use the language-related meta-data as part of a language detection algorithm (e.g., as a starting point or hint sent to an external language detection service). The web browser can also use the language-related meta-data as the only information used to detect the language of the web page (e.g., if the language-related meta-data indicates that the language of the web page is French, then the web browser can determine that the web page is in French without performing any other language detection).

Reading View

In the technologies described herein, web page content can be converted from its original format into a reading view (which can also be called a reading mode) that has a simplified format. A reading view can be used to display web page content in a simplified format that is easier to read than the original format. For example, the simplified format of the reading view can use a font type, style, layout, etc. that is easier to read on a mobile device display (e.g., on the display of a mobile phone).

For example, a mobile device can receive web page content comprising various elements, such as text, pictures, links, dynamic elements (e.g., multimedia elements) and other types of web content. When a reading view is activated (e.g., by a user selecting a user interface element when viewing the web page content), certain elements can be extracted from the web page content and presented in the reading view. For example, just the text and pictures may be extracted from the web page content and displayed in the reading view (e.g., in a particular font type and size that is more easily read on mobile device display or on another type of display, such as a laptop display or a desktop monitor).

Reading view can be activated in various ways. For example, a user viewing a web page can select a user interface element to switch to reading view. Reading view can be activated in other ways, such as by shaking the device (e.g., by a user shaking a mobile phone while viewing a web page), using voice recognition (e.g., by the user requesting "reading view" while viewing a web page), or swiping (e.g., by the user swiping left or right on the touch screen of a mobile phone while viewing a web page).

Automatically Translating Web Content in Reading View

In the technologies described herein, web content can be automatically translated upon entering reading view. For example, automatic language translation can be performed when reading view is selected and the language of the web content (e.g., the text web content) is not a language understood by the user viewing the web content. In this situation, automatic translation can be performed and the translated web content can be displayed in reading view without any additional interaction needed on the part of the user (e.g., the user does not have to select a translate button or otherwise make a selection to initiate the translation).

In some implementations, whether the language of the web content is understood by the user viewing the web content is determined by the language settings of the device. For example, a computing device, such as a mobile phone, tablet, laptop, or desktop, can be configured with a default language (e.g., a language configured when setting up the device, a language selected by a user of the device, a primary keyboard language used by the device, etc.). In some situations, a number of languages known by the user can be identified (e.g., identified based on device settings, determined automatically based on languages used by the user, etc.). Languages can also be configured on a per-user basis (e.g., a language, or languages, can be associated with a particular user when the user is using the device, such as when logging in or when the user is otherwise identified by the device).

Figure 1B:
Figure 1C:
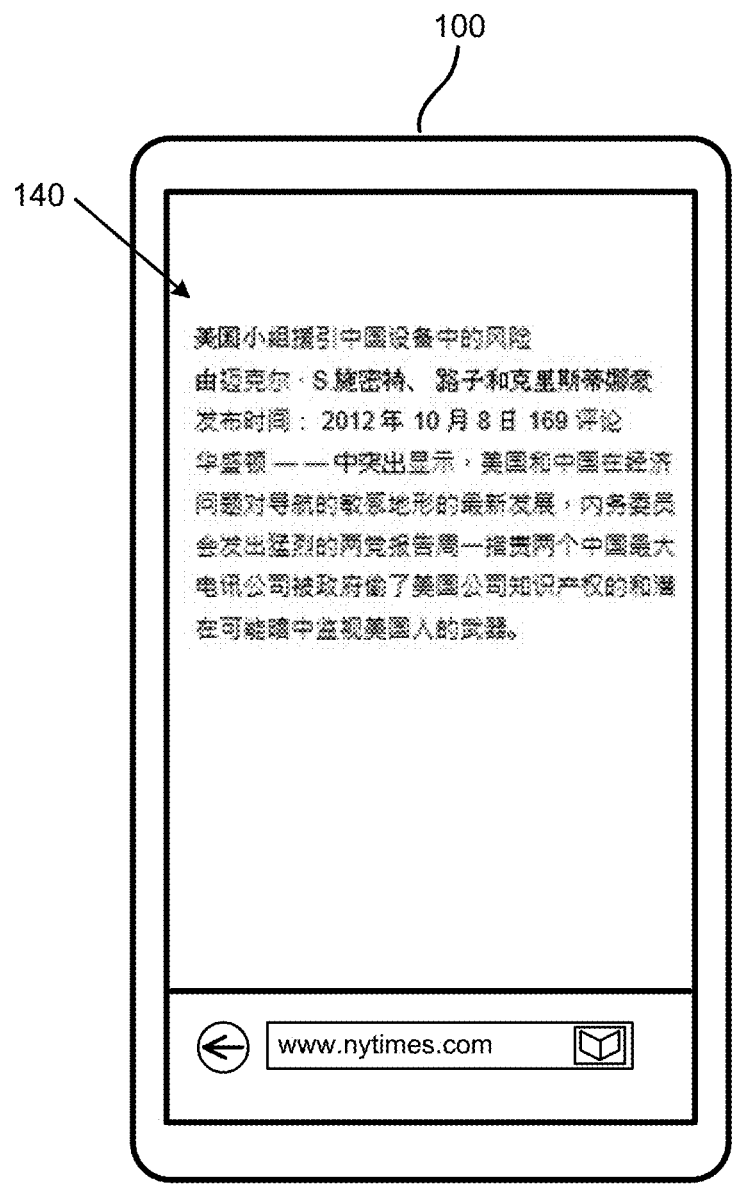

FIGS. 1A, 1B, and 1C are diagrams depicting a computing device performing automatic translation of web content upon entering reading view. In FIG. 1A, a computing device 100 is depicted. The computing device 100 is a mobile computing device (e.g., a mobile phone or tablet). As depicted in FIG. 1A, a web page 110 is displayed by a web browser running on the computing device 100. The web page 110 contains web content (which can include text, graphics, and/or other types of web content). Also depicted is a user interface element for selecting a reading view 120. Upon selection of the reading view 120, automatic translation can be performed (e.g., based on the language of the web page 110 and the language, or languages, identified as understood by the user).

In some implementations, when the reading view is selected (e.g., when the user viewing the web page 110 selects the reading view 120), a decision is made whether to automatically translate the web page. For example, the decision can be made to automatically translate the web page, and display the translated content in reading view, when a detected language of the web page is not a language understood by the user viewing the web page (e.g., as identified by language settings of the computing device). On the other hand, if the detected language of the web page is a language understood by the user, then the decision can be made to display the web page in reading view without performing any translation (i.e., in its original language).

FIG. 1B depicts the web page 110 from FIG. 1A displayed in reading view (as depicted at 130) after the user has selected the reading view 120 and upon determining that the language of the web page 110 is understood by the user. For example, the language of the web page 110 can be detected to be English (e.g., the only, or primary, language of the text web content of the web page 110). The detected language of English can then be compared to one or more languages identified as understood by the user viewing the web page 110 (e.g., identified based on a variety of information, such as an explicit language selection by the user, language settings of the computing device 100 such as operating system language settings or phone language settings, etc.). In order to illustrate the operation of FIG. 1B consider the situation where the user is a native English speaker, the computing device 110 contains language settings indicating English, and therefore the web page 110 can be displayed in reading view in English without performing any translation, as depicted at 130.

FIG. 1C depicts the web page 110 from FIG. 1A displayed in reading view (as depicted at 140) after the user has selected the reading view 120 and upon determining that the language of the web page 110 is not understood by the user. For example, the language of the web page 110 can be detected to be English (e.g., the only, or primary, language of the text web content of the web page 110). The detected language of English can then be compared to one or more languages identified as understood by the user viewing the web page 110 (e.g., identified based on a variety of information, such as an explicit language selection by the user, language settings of the computing device 100 such as operating system language settings or phone language settings, etc.). In order to illustrate the operation of FIG. 1C consider the situation where the user is a native Chinese speaker and does not understand English, the computing device 110 contains language settings indicating Chinese, and therefore the web page 110 content (e.g., the text web content) is translated to Chinese and displayed in reading view as depicted at 140.

As illustrated by FIGS. 1A, 1B, and 1C, automatic translation of web content can be performed by a computing device (e.g., by software and/or hardware components of the computing device 100, such as web browser components, operating system components, etc.) upon entering reading view. For example, upon selection of the reading view (e.g., upon user selection of a user interface element for entering reading view 120) a detected language of the web content can be compared to languages understood by the user viewing the web content (e.g., as obtained from language settings of the device). If the user understands the language of the web content, then the web content can be displayed in reading view without translation (e.g., as depicted in FIG. 1B). If the user does not understand the language of the web content, then the web content can be translated into a language that the user does understand and displayed in reading view (e.g., as depicted in FIG. 1C).

Methods for Automatically Translating Web Content in Reading View

In any of the examples herein, methods can be provided for automatically translating web content in reading view. Automatic translation can be performed when entering reading view and determining that the user does not understand the language of the web content.

Figure 2:
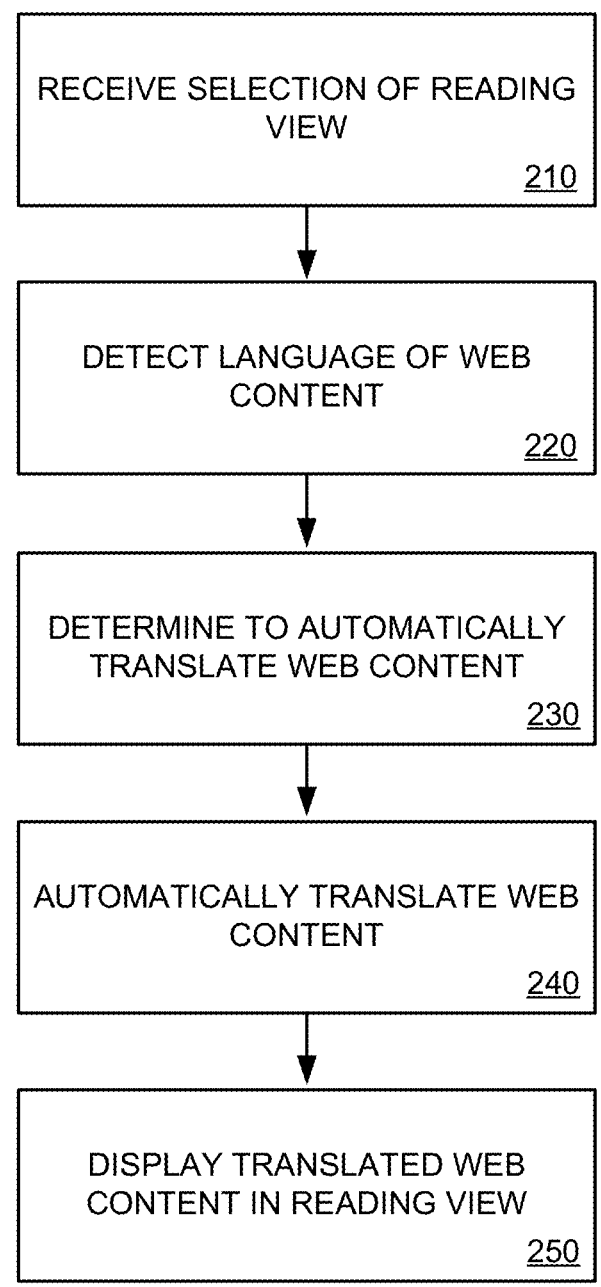
FIG. 2 is a flowchart of an example method for automatically translating web content in reading view.

FIG. 2 is a flowchart of an example method 200 for automatically translating web content in reading view. The example method 200 can be performed, at least in part, by a computing device, such as a mobile computing device (e.g., a mobile phone or tablet) or by another type of computing device (e.g., a desktop or laptop computer).

At 210, a selection of a reading view is received in association with web content. For example, the selection of the reading view can be received from a user (e.g., by the user selecting a user interface element, such as an icon, to initiate the reading view) viewing the web content. The web content can include text, graphics, links, and/or other types of web content (e.g., displayed as one or more web pages).

At 220, a language of the web content is detected. For example, the language of the web content can be detected locally (e.g., by the computing device displaying the web content) and/or remotely (e.g., using a remote service). Detecting the language of the web content can comprise detecting a primary language of the web content (e.g., the most frequently occurring language if more than one language is present). In some implementations, detecting the language of the web content is performed after the selection of the reading view at 210. In other implementations, the language of the web content is detected before the reading view is selected at 210.

In some implementations, detecting the language of the web content at is based, at least in part, upon language related meta-data. For example, the language-related meta-data can be received from another application (e.g., other than the web browser displaying the web content), such as a social media application, an email application, or a photo application.

At 230, a determination is made to automatically translate at least a portion of the web content. The determination to translate is based at least in part upon the detected language of the web content at 220. For example, the detection can comprise determining that the detected language of the web content is not a language understood by a user viewing the web content (e.g., by comparing the detected language of the web content with one or more languages identified as understood by the user, which can be obtained from language settings).

At 240, the web content is automatically translated according to the determination made at 230 from the language of the web content detected at 220 (which can be called the source language) to a language understood by the user (which can be called the destination language). Translating the web content can comprise selecting a portion of the web content (e.g., selecting text that will be displayed in the simplified layout of the reading view) and performing the translation on the selected portion of the web content. The translation can be performed locally (e.g., by a local translation component) and/or remotely (e.g., by sending selected text from the web content for translation by a remote service).

The automatic translation at 240 is performed without prompting the user to perform the automatic translation. For example, the automatic translation can be performed upon entering the reading view and determining that the language of the web content is not a language understood by the user.

In some implementations, the destination language is a pre-determined language that is understood by a user of the computing device. For example, the pre-determined language can be automatically determined from device settings and/or from other information (e.g., language(s) used by the user in email, messages, and/or other communications). The pre-determined language can also be selected by a user (e.g., as a default language of the computing device).

At 250, the translated web content is displayed in the reading view. For example, the reading view can display the translated web content in a simplified layout.

Figure 3:
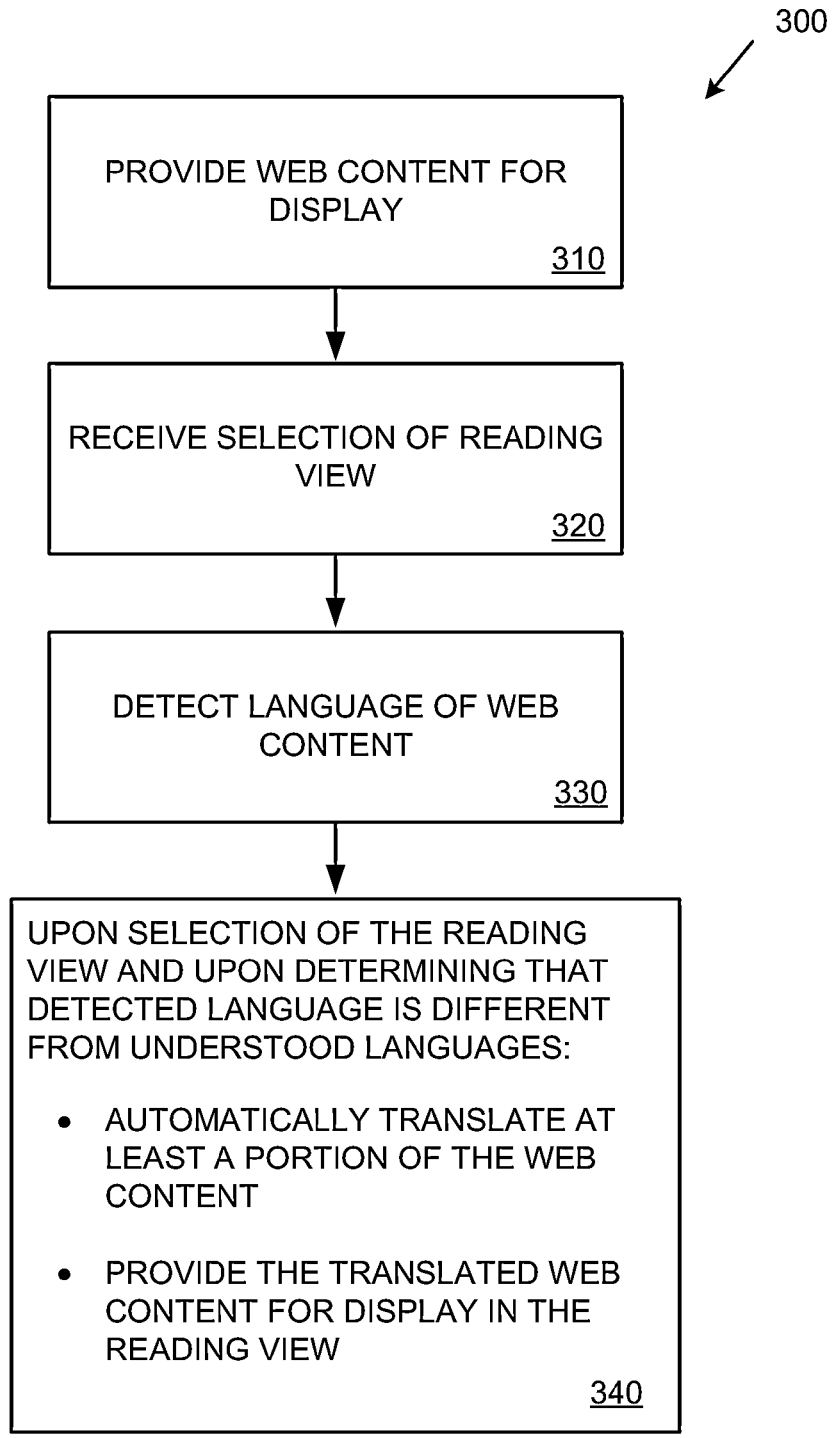
FIG. 3 is a flowchart of an example method for automatically translating web content in reading view.

FIG. 3 is a flowchart of an example method 300 for automatically translating web content in reading view. The example method 300 can be performed, at least in part, by a computing device, such as a mobile computing device (e.g., a mobile phone or tablet) or by another type of computing device (e.g., a desktop or laptop computer).

At 310, web content is provided for display. For example, the web content can be provided for display to a user of a computing device as a web page displayed by a web browser. In some implementations, the web content is provided for display by a mobile computing device (e.g., a mobile phone or tablet) via a mobile web browser.

At 320, a selection of a reading view is received in association with web content provided for display at 310. For example, the selection of the reading view can be received from a user (e.g., by the user selecting a user interface element, such as an icon displayed in association with the displayed web content, to initiate the reading view) viewing the web content. The web content can include text, graphics, links, and/or other types of web content.

At 330, a language of the web content is detected. For example, the language of the web content can be detected locally (e.g., by the computing device displaying the web content) and/or remotely (e.g., using a remote service). Detecting the language of the web content can comprise detecting a primary language of the web content (e.g., the most frequently occurring language if more than one language is present). In some implementations, detecting the language of the web content at is based, at least in part, upon language related meta-data. In some implementations, detecting the language of the web content is performed before receiving the selection of the reading view at 320.

At 340, upon selection of the reading view and upon determining that the detected language of the web content is different from languages understood by the user, automatically translating at least a portion of the web content and providing the translated web content for display in the reading view. For example, the automatic translation can be performed from a source language (e.g., the detected language of the web content) to a destination language (e.g., one of the languages understood by the user, such as a pre-determined destination language from a device language setting).

Figure 4:
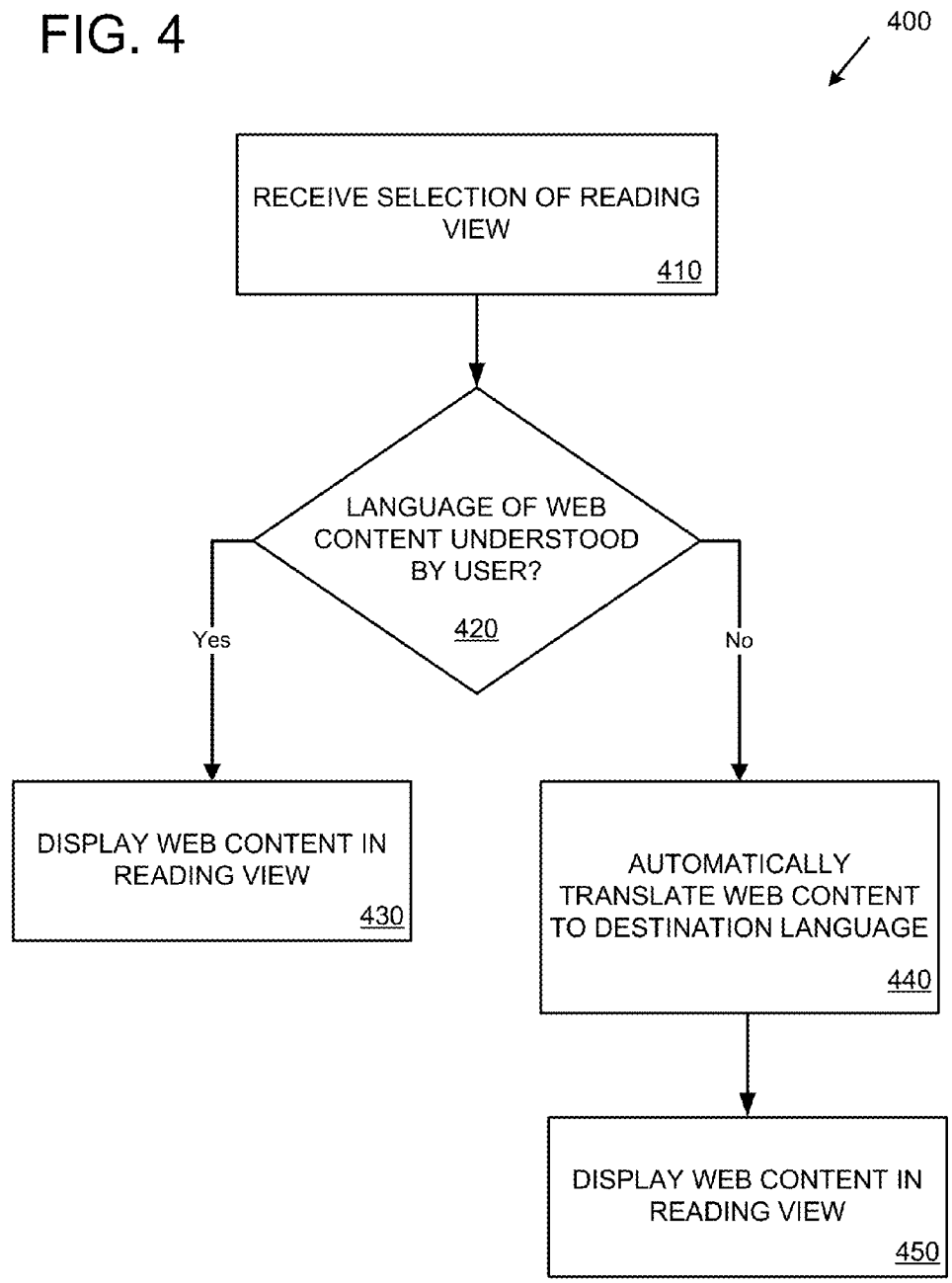
FIG. 4 is a flowchart of an example method for determining whether to automatically translate web content when entering reading view.

FIG. 4 is a flowchart of an example method 400 for determining whether to automatically translate web content when entering reading view. The example method 400 can be performed, at least in part, by a computing device, such as a mobile computing device (e.g., a mobile phone or tablet) or by another type of computing device (e.g., a desktop or laptop computer).

At 410, a selection of a reading view is received in association with displayed web content (e.g., by a web browser that is displaying a web page to a user of a computing device).

At 420, the language of the web content is compared to one or more languages understood by the user viewing the web content to determine whether the user understands the language of the web content. For example, the one or more languages understood by the user viewing the web content can be maintained as a list of pre-determined languages (e.g., as language settings of the computing device).

If the language of the web content is understood by the user, then the method proceeds to 430 where the web content is displayed in reading view in its original language (without translation).

If the language of the web content is not understood by the user, then the method proceeds to 440 where the web content is automatically translated to a destination language (e.g., a default destination language which can be the default language of the computing device). The destination language can be a language that is identified as understood by the user of the computing device. The translated web content is then displayed in reading view at 450.

Language-Related Meta-Data

In the technologies described herein, language-related meta-data can be used to improve the accuracy and/or efficiency of language detection. As an example, consider a user that is taking a picture, with the user's phone, of the Eiffel Tower while on vacation in France. The user's phone detects that there is a plaque in the photo describing the Eiffel Tower in French and linking to a website describing the history of the Eiffel Tower. Upon selection of the link to the website (e.g., the photo application can detect the plaque and the link in the photo), the phone application can pass language-related meta-data (e.g., in this case that the photo was taken in France, that the language on the plaque is in French, and/or other language-related meta-data) to the web browser application. The web browser application can use the received language-related meta-data alone or in combination with other language detection techniques to determine the language of the linked website. The web browser application can use the determined language when performing language translation (e.g., to perform automatic language translation if reading view is selected).

For example, the web browser can determine that the linked website is in French based solely on the received language-related meta-data. In this case, time and computing resources can be saved by not having to perform any other language detection techniques (e.g., language detection using an external service).

As another example, the web browser can use the language-related meta-data to improve the accuracy of the language detection (e.g., by passing the language-related meta-data to a local or remote language detection service that indicates the language of the website may be French).

Language-related meta-data can be passed from one application or service to another application or service (e.g., on the same device or on different devices, such as between a local device and a remote service). Language-related meta-data that is obtained from one application (e.g., an email application that passes the language of email messages) can be useful when another application is performing language detection (e.g., a web browser application that receives a link to a web page from the email application).

Figure 5:
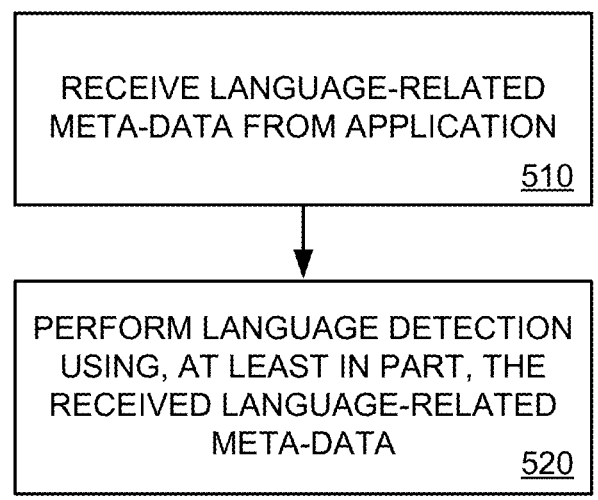
FIG. 5 is a flowchart of an example method for using language-related meta-data in language detection.

FIG. 5 is a flowchart of an example method 500 for using language-related meta-data in language detection. The example method 500 can be performed, at least in part, by a computing device, such as a mobile computing device (e.g., a mobile phone or tablet) or by another type of computing device (e.g., a desktop or laptop computer).

At 510, language-related meta-data is received from an application. For example, the language-related meta-data can be received from the application by another application (e.g., received from a first application, such as an email application, by another application, such as a web browser application). The language-related meta-data can comprise indications of one or more languages related to associated content. For example, language-related meta-data can be associated with content such as a link to a web site, a word processing document, a picture, etc.

At 520, language detection is performed using, at least in part, the received language-related meta-data. For example, the received language-related meta-data can be used solely, or in combination with other language detection techniques, to detect the language of a web page associated with the received language-related meta-data.

Selective Translation

In the technologies described herein, selective translation can be performed based on user interaction. In some implementations, selective translation is performed based on where the user is looking on the display of the device. For example, if the user is looking at a particular location of the display (e.g., as determined by a front-facing camera), then the content (e.g., text content) displayed at that location of the display can be identified. The identified content at the location being viewed can be translated (e.g., automatically and dynamically translated). Translation can be performed for an area near the location where the user is looking (e.g., the five lines of text centered where the user is looking, the paragraph where the user is looking, or within some other pre-determined or user-configured range). The automatic translation can be performed dynamically so that the content being viewed by the user is translated as the user views different portions of the displayed content.

In some implementations, selective translation is performed when a user hovers a finger over a portion of displayed content (e.g., web content and/or other content containing text). For example, when the user hovers a finger over the portion of the displayed content (e.g., when the user's finger is positioned close to the display, but not touching the display, the action can be determined to be a hover), automatic and dynamic translation can be performed (e.g., upon detecting that the content contains text in a language that the user does not understand) to a destination language (e.g., a language that the user does understand, such as a pre-configured default language that is automatically determined by the device based on various settings or pre-configured by the user). The automatic translation can be performed for the content under the user's finger or near the user's finger (e.g., the five lines of text centered where the user's finger is located, the paragraph where the user's finger is positioned, or within some other pre-determined or user-configured range of the user's finger). The automatic translation can be performed dynamically so that the content under and/or near the user's finger is translated as the user moves their finger over the display.

Computing Systems

Figure 6:
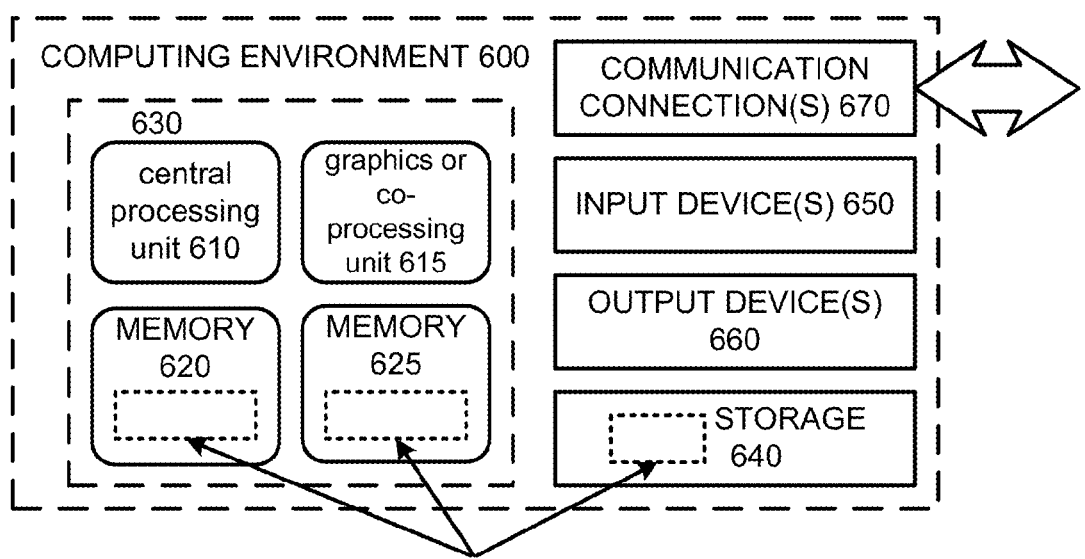
FIG. 6 is a diagram of an example computing system in which some described embodiments can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 7:
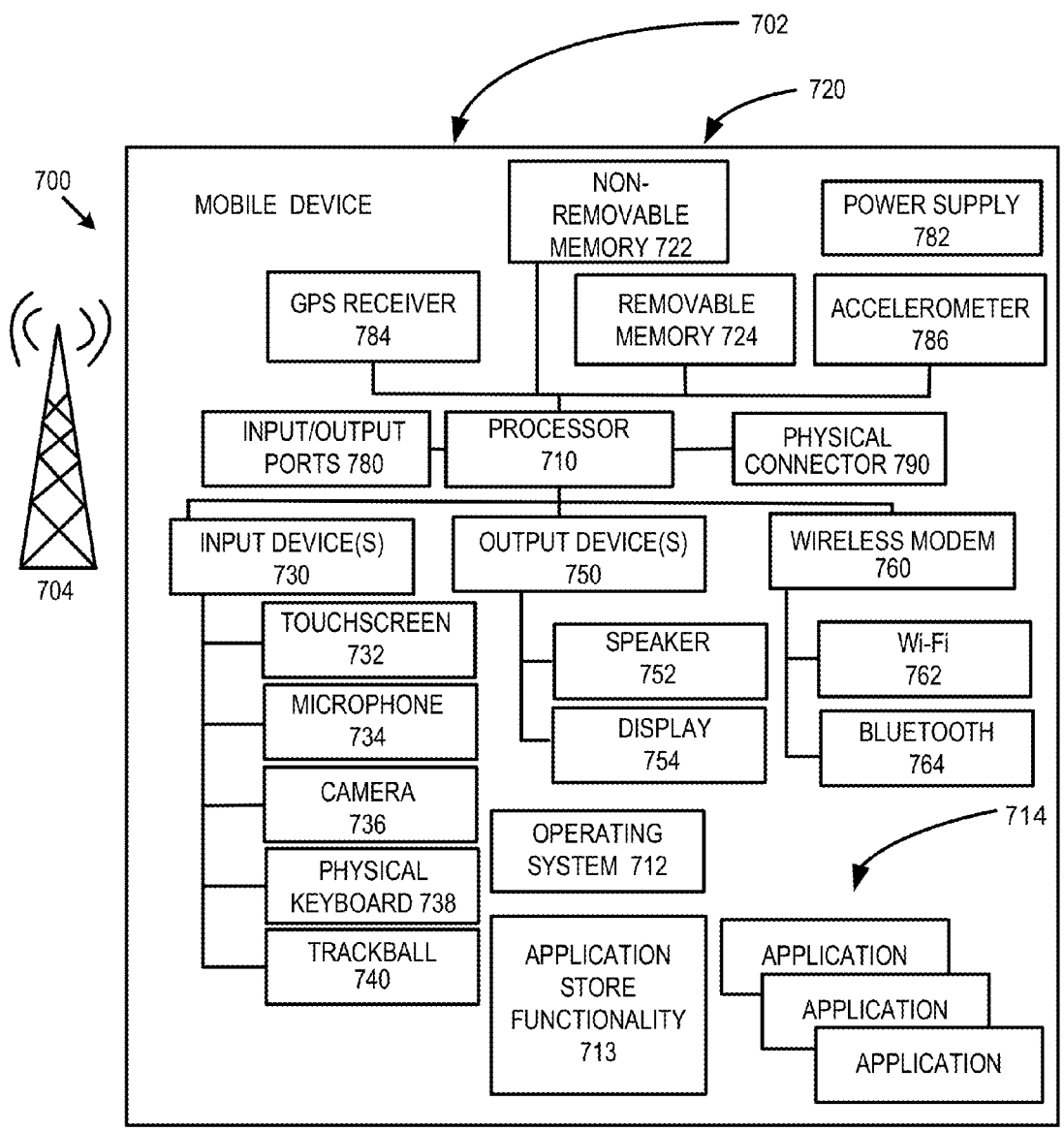
FIG. 7 is an example mobile device that can be used in conjunction with the technologies described herein.

FIG. 7 is a system diagram depicting an example mobile device 700 including a variety of optional hardware and software components, shown generally at 702. Any components 702 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 704, such as a cellular, satellite, or other network.

The illustrated mobile device 700 can include a controller or processor 710 (e.g., signal processor, microprocessor, ASIC, or other control and processing logic circuitry) for performing such tasks as signal coding, data processing, input/output processing, power control, and/or other functions. An operating system 712 can control the allocation and usage of the components 702 and support for one or more application programs 714. The application programs can include common mobile computing applications (e.g., email applications, calendars, contact managers, web browsers, messaging applications), or any other computing application. Functionality 713 for accessing an application store can also be used for acquiring and updating application programs 714.

The illustrated mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running the operating system 712 and the applications 714. Example data can include web pages, text, images, sound files, video data, or other data sets to be sent to and/or received from one or more network servers or other devices via one or more wired or wireless networks. The memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 700 can support one or more input devices 730, such as a touchscreen 732, microphone 734, camera 736, physical keyboard 738 and/or trackball 740 and one or more output devices 750, such as a speaker 752 and a display 754. Other possible output devices (not shown) can include piezoelectric or other haptic output devices. Some devices can serve more than one input/output function. For example, touchscreen 732 and display 754 can be combined in a single input/output device.

The input devices 730 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 712 or applications 714 can comprise speech-recognition software as part of a voice user interface that allows a user to operate the device 700 via voice commands. Further, the device 700 can comprise input devices and software that allows for user interaction via a user's spatial gestures, such as detecting and interpreting gestures to provide input to a gaming application.

A wireless modem 760 can be coupled to an antenna (not shown) and can support two-way communications between the processor 710 and external devices, as is well understood in the art. The modem 760 is shown generically and can include a cellular modem for communicating with the mobile communication network 704 and/or other radio-based modems (e.g., Bluetooth 764 or Wi-Fi 762). The wireless modem 760 is typically configured for communication with one or more cellular networks, such as a GSM network for data and voice communications within a single cellular network, between cellular networks, or between the mobile device and a public switched telephone network (PSTN).

The mobile device can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components 702 are not required or all-inclusive, as any components can be deleted and other components can be added.

Cloud-Supported Environment

Figure 8:
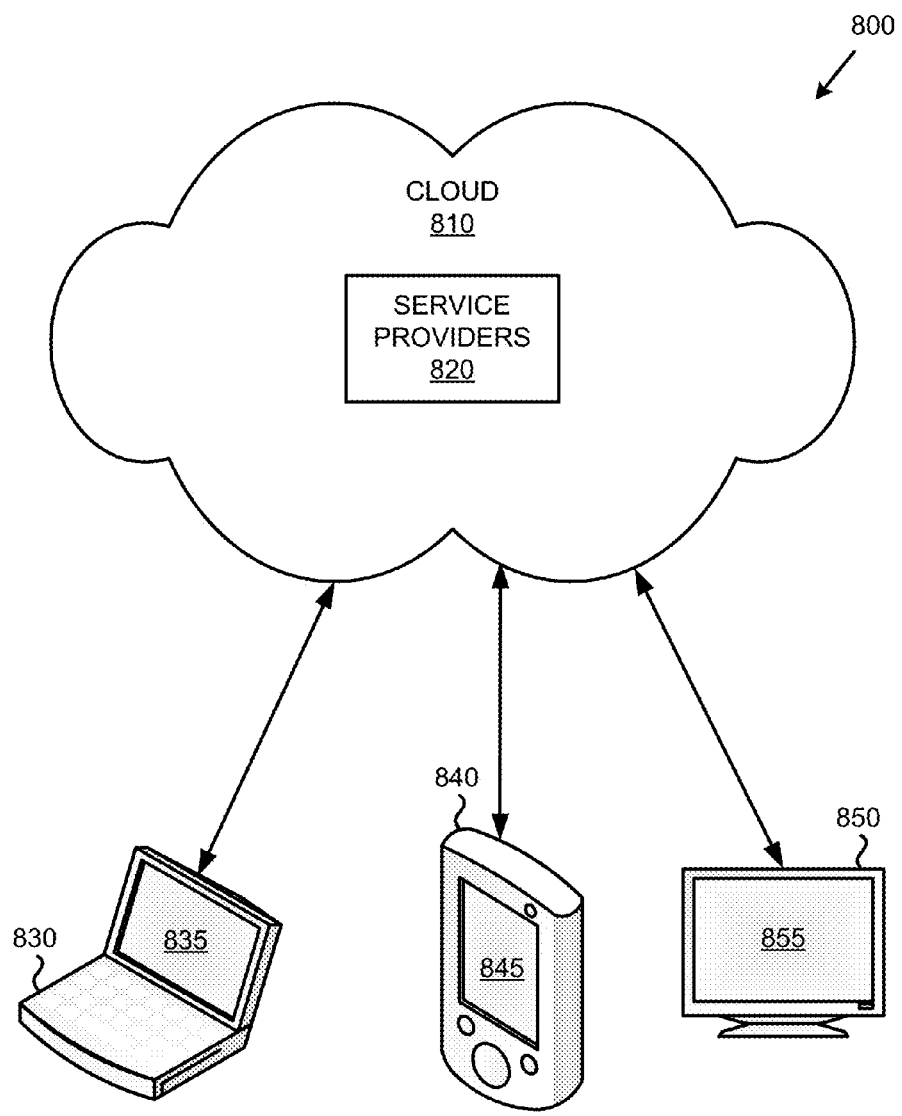
FIG. 8 is an example cloud-support environment that can be used in conjunction with the technologies described herein.

FIG. 8 illustrates a generalized example of a suitable cloud-supported environment 800 in which described embodiments, techniques, and technologies may be implemented. In the example environment 800, various types of services (e.g., computing services) are provided by a cloud 810. For example, the cloud 810 can comprise a collection of computing devices, which may be located centrally or distributed, that provide cloud-based services to various types of users and devices connected via a network such as the Internet. The implementation environment 800 can be used in different ways to accomplish computing tasks. For example, some tasks (e.g., processing user input and presenting a user interface) can be performed on local computing devices (e.g., connected devices 830, 840, 850) while other tasks (e.g., storage of data to be used in subsequent processing) can be performed in the cloud 810.

In example environment 800, the cloud 810 provides services for connected devices 830, 840, 850 with a variety of screen capabilities. Connected device 830 represents a device with a computer screen 835 (e.g., a mid-size screen). For example, connected device 830 could be a personal computer such as desktop computer, laptop, notebook, netbook, or the like. Connected device 840 represents a device with a mobile device screen 845 (e.g., a small size screen). For example, connected device 840 could be a mobile phone, smart phone, personal digital assistant, tablet computer, and the like. Connected device 850 represents a device with a large screen 855. For example, connected device 850 could be a television screen (e.g., a smart television) or another device connected to a television (e.g., a set-top box or gaming console) or the like. One or more of the connected devices 830, 840, 850 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 800. For example, the cloud 810 can provide services for one or more computers (e.g., server computers) without displays.

Services can be provided by the cloud 810 through service providers 820, or through other providers of online services (not depicted). For example, cloud services can be customized to the screen size, display capability, and/or touchscreen capability of a particular connected device (e.g., connected devices 830, 840, 850).

In example environment 800, the cloud 810 provides the technologies and solutions described herein to the various connected devices 830, 840, 850 using, at least in part, the service providers 820. For example, the service providers 820 can provide a centralized solution for various cloud-based services. The service providers 820 can manage service subscriptions for users and/or devices (e.g., for the connected devices 830, 840, 850 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 6, computer-readable storage media include memory 620 and 625, and storage 640. By way of example and with reference to FIG. 7, computer-readable storage media include memory and storage 720, 722, and 724. The term computer-readable storage media does not include signals and carrier waves. In addition, the term computer-readable storage media does not include communication connections (e.g., 670, 760, 762, and 764).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented by a computing device, for automatic translation of web content in reading view, the method comprising:
    displaying web content within a web browser to a user associated with the computing device;
    receiving a selection of a reading view in association with the web content displayed by the computing device, wherein the reading view is activated by the user associated with the computing device, and wherein the reading view operates by extracting a subset of elements from the web content and displaying the extracted elements in a simplified layout;
upon the selection of the reading view:
detecting a language of the web content, wherein detecting the language of the web content is only performed after the reading view has been selected;
determining to automatically translate at least a portion of the web content based at least in part upon the detected language of the web content;
automatically translating the at least a portion of the web content from the language of the web content to a destination language, wherein the automatically translating is performed automatically, without user intervention, by the computing device upon entering the reading view and determining that the detected language of the web content is not a language understood by the user associated with the computing device; and
displaying the translated web content in the reading view in the simplified layout.

2. The method of claim 1 wherein determining to automatically translate at least a portion of the web content comprises:
obtaining the destination language;
determining that the detected language of the web content is different from the destination language.

3. The method of claim 1 wherein the destination language is a pre-determined language obtained from one or more language settings of the computing device.

4. The method of claim 1 wherein the wherein the destination language is a pre-determined language that is automatically determined by the computing device as a language understood by the user of the computing device.

5. The method of claim 1 wherein the automatically translating is performed without prompting the user to perform the automatic translation.

6. The method of claim 1 wherein the detected language of the web content is different from one or more languages identified as understood by the user of the computing device.

7. The method of claim 1 wherein the computing device is a mobile phone, wherein the web content is displayed by a mobile web browser running on the mobile phone.

8. The method of claim 1 wherein the automatically translating the at least a portion of the web content for display in the simplified layout comprises:
extracting only the text and picture elements from the web content;
wherein only the translated extracted text and picture elements are displayed in the reading view in the simplified layout.

9. The method of claim 1 wherein displaying the web content within the web browser to the user comprises:
displaying a user interface element in association with the displayed web content for initiating the reading view;
wherein the reading view is selected by the user via a selection of the displayed user interface element.

10. A mobile computing device comprising:
a processing unit;
memory; and
a display;
the mobile computing device configured to perform operations for automatic translation of web content in reading view, the operations comprising:
providing web content for display within a web browser to a user of the mobile computing device;
receiving a selection of a reading view in association with the web content provided for display, wherein the reading view is activated by the user of the mobile computing device, and wherein the reading view operates by extracting a subset of elements from the web content and displaying the extracted elements in a simplified layout;
detecting a language of the web content, wherein detecting the language of the web content is only performed after the reading view has been selected; and
upon selection of the reading view and upon determining that the detected language of the web content is different from one or more languages identified as understood by the user of the mobile computing device:
automatically translating at least a portion of the web content from the language of the web content to a destination language, wherein the automatically translating is performed automatically, without user intervention, by the mobile computing device upon entering the reading view and determining that the detected language of the web content is different from one or more languages identified as understood by the user; and
providing the translated web content for display in the reading view in the simplified layout.

11. The mobile computing device of claim 10 wherein the destination language is one of the one or more languages identified as understood by the user of the mobile computing device.

12. The mobile computing device of claim 10 wherein the destination language is a preferred language that is automatically determined by the mobile computing device.

13. The mobile computing device of claim 10 wherein the automatically translating is performed without prompting the user to perform the automatic translation.

14. The mobile computing device of claim 10 wherein the operations are performed, at least in part, by a mobile web browser running on the mobile computing device.

15. The mobile computing device of claim 10 wherein the automatically translating the at least a portion of the web content for display in the simplified layout comprises:
extracting only the text and picture elements from the web content;
wherein only the translated extracted text and picture elements are provided for display in the reading view in the simplified layout.

16. A computer-readable storage medium storing computer-executable instructions for causing a computing device to perform a method for automatic translation of web content in reading view, the method comprising:
displaying web content within a web browser to a user associated with the computing device;
receiving a selection of a reading view in association with the displayed web content, wherein the reading view is activated by the user associated with the computing device, and wherein the reading view operates by extracting a subset of elements from the web content and displaying the extracted elements in a simplified layout;
responsive to receiving the selection of the reading view:
detecting a language of the web content, wherein detecting the language of the web content is only performed after the reading view has been selected;
determining to automatically translate at least a portion of the web content based at least in part upon the detected language of the web content and one or more language settings of the computing device;

automatically translating the at least a portion of the web content from the detected language of the web content to a destination language, wherein the automatically translating is performed automatically, without user intervention, by the computing device upon entering the reading view and determining that the detected language of the web content is not a language understood by the user associated with the computing device; and displaying the translated web content in the reading view in the simplified layout.

17. The computer-readable storage medium of claim 16 wherein determining to automatically translate at least a portion of the web content comprises:

obtaining the destination language from the one or more language settings of the computing device; and determining that the detected language of the web content is different from the destination language.

18. The computer-readable storage medium of claim 16, the method further comprising:

receiving language-related meta-data;

wherein the language-related meta-data is used, at least in part, in detecting the language of the web content.

19. The computer-readable storage medium of claim 18, wherein detecting the language of the web content is performed using only the received language-related meta-data.

20. The computer-readable storage medium of claim 16 wherein the automatically translating the at least a portion of the web content for display in the simplified layout comprises:

extracting only text and picture elements from the web content;

wherein only the translated extracted text and picture elements are displayed in the reading view in the simplified layout.

* * * * *